No. 717,134. Patented Dec. 30, 1902.
A. F. STREET.
APPARATUS FOR MOVING TREES.
(Application filed Mar. 22, 1902.)
(No Model.)
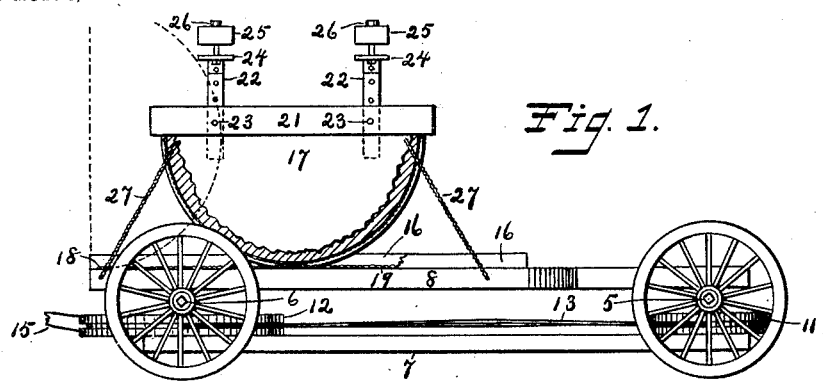
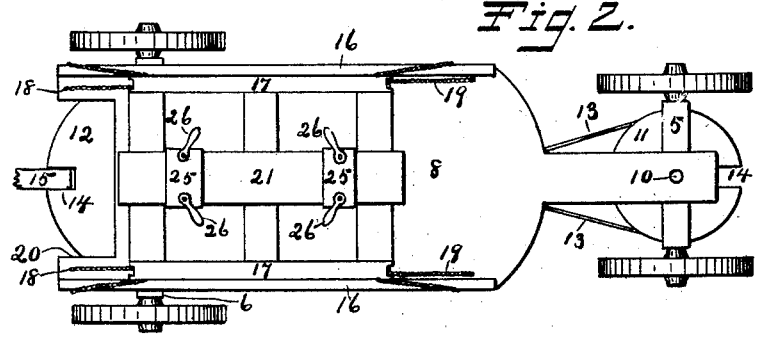
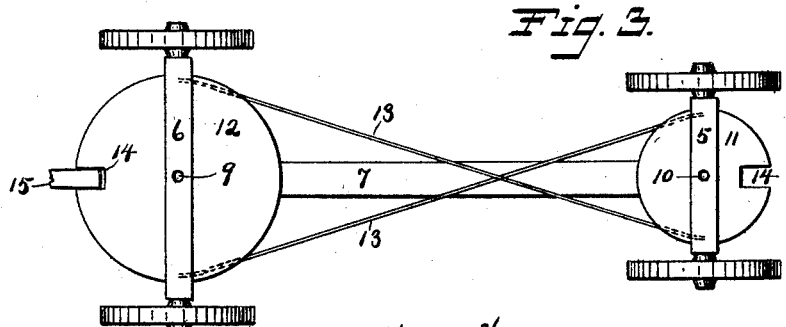
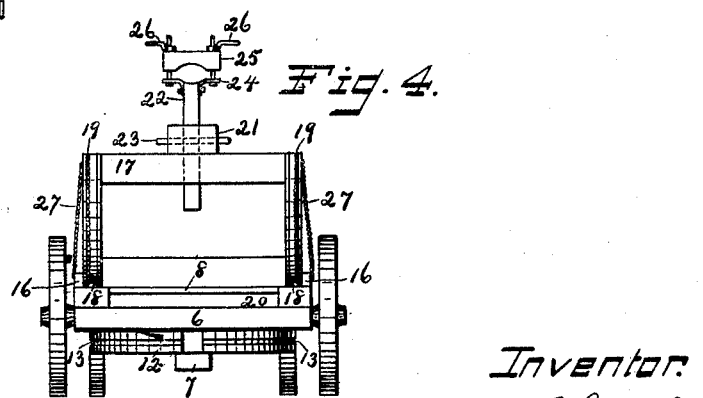
Witnesses.
S. H. Clarke
D. A. Harris
Inventor.
Albert F. Street.
By James Shepard
Atty.

UNITED STATES PATENT OFFICE.

ALBERT F. STREET, OF ROCKVILLE, CONNECTICUT.

APPARATUS FOR MOVING TREES.

SPECIFICATION forming part of Letters Patent No. 717,134, dated December 30, 1902.

Application filed March 22, 1902. Serial No. 99,452. (No model.)

*To all whom it may concern:*

Be it known that I, ALBERT F. STREET, a citizen of the United States, residing at Rockville, in the county of Tolland and State of Connecticut, have invented certain new and useful Improvements in Apparatus for Moving Trees, of which the following is a specification.

My invention relates to improvements in apparatus for moving trees; and the objects of my improvement are simplicity and economy in the production of the apparatus and efficiency and convenience in its use.

In the accompanying drawings, Figure 1 is a sectional side elevation of my apparatus. Fig. 2 is a plan view of the same. Fig. 3 is a plan view of the running-gear with the platform and cradle removed therefrom. Fig. 4 is an end view of the complete apparatus.

I connect the two axles 5 6 by means of any proper reach 7, and upon the said axles I secure the platform 8, which is made rigid with the longer axle 6, so that the said axle cannot swivel on its king bolt or pin 9. The shorter axle 5 is connected to the platform and the reach by means of the king-bolt 10, so that the said axle swivels thereon. Underneath the respective axles I arrange the cross-wheels 11 12, the wheel 12 being pivoted on the bolt 9 and free from the reach 7 and the axle 6. The wheel 11 is made fast to the swiveling axle 5, but free from the reach, so that the said axle and wheel swivel on the king-bolt 10. The wheels 11 and 12 are grooved at their edge and cables or chains 13 connect the said wheels, the said cables crossing each other and being secured by their ends to the wheels within the said groove of the wheels, as shown. The wheels 11 and 12 are both slotted to form hounds 14 for attaching a pole or neap 15 to either of the said wheels for drawing the wagon, so as to draw it with either end foremost, as may be desired. While I have for convenience described the parts 11 and 12 as "cross-wheels," it should be noted that only a small portion of their peripheries has any wheel function.

When the wagon is drawn with the swiveled or shorter axle 5 foremost, it operates the same as any ordinary running-gear, with said axle swiveling as the wagon is turned from side to side. The wheel 12 on the fixed axle 6 also turns with the shorter axle 5 and wheel 11, but has no function. When, however, the gear is drawn with the fixed or longer axle 6 foremost, the wheel 12 swivels as the pole 15 is moved toward one side, and thus by means of the cables 13 the wheel 11 and shorter axle, now in the rear, are turned or swiveled to make the running-gear travel toward one side, according to the deflection of the pole.

Upon the platform or body 8 I form cradle-guides 16, and fitted to the said guides is the hingeless and rolling cradle 17 of a semicircular form in side view. This cradle is grooved at each side on its circular portion for the reception of the chains 18 and 19, that govern its position on the wagon. I prefer to have the wagon body or platform 8 cut away, as at 20, at its wider end to make room for the roots. The chains 18 are secured by one end to the platform near the wide end, then when the cradle is in the position shown by full lines extend along on the wagon-platform to the cradle, and then follow up the circular part of the cradle in its groove to the top, where the other end of the chain is secured. The chains 19 lie by the side of the chains 18, and their ends are reversely secured from those of the chains 18. In other words, the upper end of the chains 19 is secured to that end of the cradle that is nearest the wider end of the platform, and then after following the curve of the cradle downwardly to the platform the chains extend along on the top of the platform toward the narrow end, where the end of the chain is secured. This construction permits the cradle to rock or roll into any desired incline or to stand with its straight portion in a vertical position, as indicated by the broken lines in Fig. 1, and at the same time the chains secure it against moving out of place longitudinally of the platform.

If desired, any suitable tree-holder may be placed upon or secured to the straight side of the cradle, or the tree may be bound directly to the said straight side. I have shown a beam or base 21 on the cradle, the said beam having sockets for the uprights 22, which may be adjusted to any desired height by means of the pin 23, which may be passed through a hole in the beam and any desired one of a series of holes in the uprights. The upper ends of the uprights are provided with clamping-bars 24 and 25, which may be made to embrace the body of the tree and bound thereon by means of the bolts and handle-nuts 26. Any suitable chains or cables 27 may be used to fasten the cradle in position to prevent its rocking or rolling on the platform.

When the wagon is not loaded with a tree, it will generally be drawn by placing the pole 15 in the hounds of the wheel 11 of the shorter axle 5. When the earth has been sufficiently removed from around the roots of the tree, the wider end of the wagon is presented to the standing tree, the chains or cables 27 unfastened, and the cradle rolled so as to bring its straight side into a vertical position. The body of the tree may then be secured directly to the cradle or to the tree-holder on the cradle, as may be desired. If directly to the cradle, the wagon should be arranged in such a position as to bring the straight side of the cradle squarely up against the body of the tree. If to the tree-holder, then the wagon should be arranged to bring the clamps on the tree-holder as nearly against the body of the tree as may be. One or both of the uprights may then be adjusted to bring the tree-holder into the desired relation to the tree and cradle. When all is ready, the tree is pulled over by any suitable mechanical appliance to carry the top over the wagon, the tree rocking on the cradle as the top goes over, whereby the entire tree is lifted and its roots pulled out as the cradle rolls from the vertical position (indicated by broken lines in Fig. 1) to its horizontal position (shown by full lines) or to any such slight variation from horizontal as will best suit the general shape of the tree. The cradle may then be fastened by the cables 27 and the loaded tree is ready to move. It is best to draw it with the roots foremost, and hence the team should be hitched to the wider end of the wagon.

It is apparent that some changes from the specific construction herein disclosed may be made, and therefore I do not wish to be understood as limiting myself to the precise form of construction shown and described, but desire the liberty to make such changes in working my invention as may fairly come within the spirit and scope of the same.

I claim as my invention—

1. In a tree-mover, the combination of the fixed axle and swiveled axle, with the cross-wheels, one of which is rigid with the swiveled axle and the other swiveled on the fixed axle, the cables 13 secured to and connecting the said cross-wheels, and a pole secured to the swiveled cross-wheel of the fixed axle for drawing the apparatus with its fixed axle foremost, substantially as described.

2. In a tree-mover, the combination of the wagon-platform, with the hingeless cradle having a tree-receiving side, the said cradle being secured on the said platform and arranged to roll thereon for changing its tree-receiving side from a vertical to a horizontal position and vice versa, substantially as described.

3. In a tree-mover, the combination of the wagon-platform with the hingeless rolling cradle and the two sets of chains for confining the cradle against moving out of place longitudinally of the platform while permitting it to roll thereon, substantially as described.

ALBERT F. STREET.

Witnesses:
JAMES SHEPARD,
SHEFFIELD H. CLARKE.